United States Patent
Fischer (10) Patent No.: US 6,216,229 B1
(45) Date of Patent: Apr. 10, 2001

(54) METHOD FOR PREVENTING INADVERTENT BETRAYAL BY A TRUSTEE OF ESCROWED DIGITAL SECRETS

(76) Inventor: Addison M. Fischer, 60 14th Ave. South, Naples, FL (US) 33942

( * ) Notice: Subject to any disclaimer, the term of this patent is extended or adjusted under 35 U.S.C. 154(b) by 0 days.

(21) Appl. No.: 09/617,814

(22) Filed: Jul. 17, 2000

Related U.S. Application Data (62) Division of application No. 08/464,069, filed on Jun. 5, 1995, now Pat. No. 6,141,423, which is a continuation of application No. 08/130,126, filed on Oct. 4, 1993, now Pat. No. 5,436,972.

(51) Int. Cl.$^7$ ....................................................... H04L 9/32

(52) U.S. Cl. ..................... 713/182; 713/183; 713/202; 380/277; 380/286

(58) Field of Search ................................. 713/155, 156, 713/182, 183, 200, 202, 185, 186; 380/286, 277, 279

(56) References Cited

U.S. PATENT DOCUMENTS

| | | | |
|---|---|---|---|
| 5,091,939 | * 2/1992 | Cole et al. ........................... | 713/183 |
| 5,222,135 | * 6/1993 | Hardy et al. ........................ | 713/183 |
| 5,278,904 | * 1/1994 | Servi ................................... | 713/183 |
| 5,345,549 | * 9/1994 | Appel et al. ........................ | 345/348 |
| 5,418,854 | * 5/1995 | Kaufman et al. ................... | 713/156 |

FOREIGN PATENT DOCUMENTS

WO92/09161 * 11/1991 (WO) .................................. 380/125

OTHER PUBLICATIONS

U.S. Patent application Ser. No. 08/464,069, filed Jun. 5, 1995 now US Pat 6,141,423 Oct. 2000.

U.S. Patent application Ser. No. 08/130,126, filed Oct. 4, 1993 now US Pat 5,436,972 Jul. 1995.

* cited by examiner

Primary Examiner—Gilberto Barron, Jr.
(74) Attorney, Agent, or Firm—Nixon & Vanderhye P.C.

(57) ABSTRACT

The invention employs a voluntary identification/definition phase performed, for example, shortly after a computer is purchased, and a secret information retrieval phase. In the definition phase, the true owner/customer defines an escrow record which provides self-identification data together with encrypted password data. The present invention prompts a user to voluntarily escrow password or other secret information for later retrieval by entering a series of information uniquely describing himself or herself. The identification indicia is combined with the secret information (such as the user's encryption password) and is then encrypted under the control of the trustee's public key. The combined information may be encrypted, for example, under a random symmetric key (such as DES) which is then encrypted under the trustee's public key. After unique identification data has been entered, the user is asked to select a password to protect the system. Thereafter, all the personal identifying data, together with the password, is encrypted with the trustee's public key and is stored, for example, in the user's computer as an escrow security record. The password is then used to encrypt all data on the user's disk. If at some point in time in the future, the user forgets the password, the retrieval phase of the applicant's invention is performed. Under such circumstances, the user contacts the trustees, e.g., the vendor or manufacturer. The trustee utilizes documentary, evidence presented by the alleged legitimate user and determines whether such evidence matches with the previously encrypted escrow information stored in the escrow record created by the user. If they agree, then the trustee has confidence that the true owner is making the request, and that revealing the secret key will not betray the owner's interest.

1 Claim, 6 Drawing Sheets

Fig. 1

STANDARD IDENTIFYING INFORMATION 18

| CHARACTERISTIC | TYPE | VALUE |
|---|---|---|
| 20 NAME | TEXT | ROBERT SMILEY |
| 22 ADDRESS | TEXT | 651 SNOW EAGLE DRIVE; DAYTON, OHIO USA 45403 |
| 24 BIRTHDATE | TEXT | 15 DEC 1956 |
| 26 BIRTH PLACE | TEXT | WILMINGTON DE |
| 28 TELEPHONE NUMBER | TEXT | 513-278-6734 |
| 30 USER'S PUBLIC KEY | BINARY | (BINARY PUBLIC KEY ALA X.500) |
| 32 EMPLOYER | TEXT | FLAGSTON TOOL AND DIE |
| 34 TITLE | TEXT | ADVERTISING MANAGER |
| 36 SUPERVISOR | TEXT | EMILY JANE WHITEHALL |
| 38 EMPLOYEE NUMBER | ABSENT | (OMITTED) |
| 40 SOCIAL SECURITY | TEXT | 762-553-8926 |
| 42 DRIVER'S LICENSE | TEXT | OHIO PC782352 |
| 44 HEIGHT | TEXT | 5'9" |
| 46 WEIGHT | TEXT | 175 |
| 47 RACE | TEXT | CAUCASIAN |
| 48 EYE COLOR | TEXT | BROWN |
| PHOTOGRAPH | HASH | (HASH OF DIGITIZED IMAGE) |
| 50 FINGERPRINT IMAGE | ABSENT | |
| 52 RETINA PARAMETERS | ABSENT | |
| 54 VOICE PRINT MESSAGE | ABSENT | |
| 56 HANDWRITING IMAGE | PCX | IMAGE OF HANDWRITING |
| 58 WRITING STROKE INFO | ABSENT | |
| 60 DNA PATTERNS/ DNA, PROTEINS OR OTHER BIOLOGICAL IDENTIFIERS | ABSENT | |
| 64 ETC. | | |

PRIVATE IDENTIFYING INFORMATION 70

PLEASE IDENTIFY ME WITH THESE TWO QUESTIONS:

Q: WHEN I WAS THREE YEARS OLD, WHAT DID MY SISTER CALL ME?
A: "BOBBY BIRDIE"

Q: WHO WAS MY FIRST PET?
A: A TURTLE NAMED "HENRY".

ADDITIONAL ADVICE AND REQUESTS:
I HEREBY AUTHORIZE THE TRUSTEE TO TRY TO PHYSICALLY RECLAIM MY COMPUTER IF AN IMPOSTER IS SUSPECTED. ALSO, PLEASE GAIN AS MUCH INFORMATION AS POSSIBLE ABOUT ANYONE ATTEMPTING TO GAIN UNAUTHORIZED ACCESS. PLEASE NOTIFY ME BY USING THE CONTACT INFORMATION SUPPLIED ABOVE.

METHOD FOR PREVENTING INADVERTENT BETRAYAL BY A TRUSTEE OF ESCROWED DIGITAL SECRETS

This is a divisional of application Ser. No. 08/464,069, filed Jun. 5, 1995, now U.S. Pat. No. 6,141,423 which is a continuation of Ser. No. 08/130,126 filed Oct. 4, 1993, now U.S. Pat. No. 5,436,972.

FIELD OF THE INVENTION

The present invention relates generally to computer data security. More particularly, the invention relates to a method and apparatus for preventing a trustee holding escrowed security information from revealing the information to someone other than a party legitimately entitled to receive such information.

BACKGROUND AND SUMMARY OF THE INVENTION

In modern computer systems, especially those using a PC or laptop computer, it is common for the data stored in, for example, disk memory to be encrypted. This offers the user great protection against the stored data being discoverable by a thief—even when the computer is stolen.

Typically, such stored the information is encrypted with a key which is derived in some fashion from a password known only to the user. The password is converted via well known cryptographic processing techniques into a cryptographic key, which is used to decrypt (and thereby access) all information stored in the computer.

Particularly if sensitive data is being stored, most standard security practices urge users not to record passwords—lest they be discovered by an adversary. Since the data stored in the computer is present only in its encrypted form, without knowledge of the password, it is, for all practical purposes, inaccessible. Accordingly, a serious problem is created if the user forgets the password.

In practice, from time to time users do forget their passwords. The problem is compounded by the possibility that a disgruntled employee may refuse to supply or "forget" the password to a corporate computer which has previously been assigned to the employee.

One attempted solution to this problem is to "escrow" the password (or some other key information associated with the encryption) with a trustee, i.e., a trusted entity, such as, for example, a computer security software officer in the user's organization. The user may use the trustee's public key to encrypt the secret information and store the information in, for example, with the trustee, with a 3rd party or with the protected computer itself. In this fashion, the trustee could, in case of emergency, be given the resulting escrowed cipher text and use its private key to decrypt and retrieve the escrowed secret.

When the user is well know to the escrow agent, the process for retrieving the secret information is relatively straightforward. The known user presents the escrowed information (possibly including the entire computer) to the trustee, who then retrieves the escrowed information with the trustee's private key (the other half of the public/private key pair) associated with the trustee's encrypting public key) to decrypt the user's secret information. The user may be provided with a program to extract the escrowed information to be forwarded to the trustee. If only the trustee has access to the decrypting private key, the escrowed information is not compromised by the storage of the escrowed information in the user's computer.

The present invention addresses the danger that the trustee might be tricked into revealing escrowed information to someone other than the legitimate owner (or another party entitled to receive the escrowed information). For example, a thief could present a stolen computer to the trustee claiming that it is their own.

In practice, it is not unusual for vendors of computer data encryption products to be asked to help users who claim to have forgotten or otherwise lost their password. Contrary to whatever warnings are offered, users expect vendors to help recover their stored information. If a vendor cannot or will not assist a user due, for example, to fear of liability for revealing sensitive information to a thief, a bona fide user will typically become irate. The risk to the vendor is that the alleged user may not actually be the true owner of the sensitive data but rather an adversary of the true owner—e.g., someone to whom giving access to the computer could potentially severely harm the true owner. Accordingly, the vendor may be faced with the dilemma of whether or not to assist in "re-enabling" a lost key for an often frantic customer.

In accordance with the present invention, various alternative binary data strings may be escrowed. A password used to derive a symmetric DES key which is used to encrypt the user's secret may be escrowed. In its broadest sense, the present invention contemplates escrowing any secret digital information voluntarily placed in the hands of an escrow agent (e.g., a Swiss bank account number, safety deposit identifying indicia, vault combination, the formula for Coca Cola® or the like). The present invention permits a user to cryptographically secure such data and to securely permit a manufacturer, vendor, or other escrow agent's (trustee) to allow the user to access data under circumstances where the password is forgotten or lost.

The present invention is designed to reduce, if not eliminate, the risk of a trustee escrow agent's (e.g., vendor) possible inadvertent betrayal while balancing the escrow agent's goal of providing security, with optional recoverability—even when the true owner/customer was previously unknown to the vendor. The present invention provides significant assurance to both user and trustee that the trust delegated will not be betrayed if the trustee assists in re-enabling a lost key or password.

The present invention accomplishes these objectives utilizing methodology employing a voluntary identification/definition phase performed, for example, shortly after a computer is purchased, and a secret information retrieval phase. In the definition phase, the true owner/customer defines an escrow record which provides self-identification data together with encrypted password or other secret data. The present invention contemplates prompting a user to voluntarily escrow password or other secret information for later retrieval by entering a series of information uniquely describing himself or herself. The identification indicia is combined with the secret information (such as the user's encryption password) and is then encrypted under the control of the trustee's public key. There are many ways of doing this, and the examples herein are demonstrative and not exhaustive. For example, the combined information may be encrypted, for example, under a random symmetric key (such as DES) which is then encrypted under the trustee's public key.

In an embodiment of the invention, after unique identification data has been entered, the user is asked to select a password to protect the system. Thereafter, all the personal identifying data, together with the password, is encrypted with the manufacturer's (trustee's) public key and is stored, for example, in the user's computer as an escrow security record. The password is then used to encrypt all data on the user's disk.

If at some point in time in the future, the user forgets the password, the retrieval phase of the applicant's invention is performed. Under such circumstances, the user contacts the escrow agent, e.g., the vendor or manufacturer. In accordance with one embodiment of the invention, the user (applicant) must provide sufficient credentials to definitively establish his or her identification. This might take the form of an affidavit executed before a notary public. It might occur by using a digitally signed message verifiable with a well certified public key (or the public key indicated in the escrowed information itself). It might require production of a driver's license, independent investigation by the trustee; or the physical presence of the applicant to confirm identity. In accordance with one embodiment of the present invention, the user in initially establishing the escrow record is asked to define for the vendor what security measures are to be required if the key (or other secret information) must sometimes be retrieved, such as, by requiring identification performed before a notary, a personal appearance, production of a valid driver's license, etc. This allows the true owner to stipulate recovery procedures.

In order to retrieve the escrowed secret, the trustee(s) must have both the encrypted escrowed information as well as the user's credentials. The order in which these are presented to the trustee can vary depending upon the specific embodiment. For example, in the model in which the trustee (or some other third party) stores the escrowed information, one presumes that it is easy for the user to extract the escrowed information (say at the time it was created) and transmit it to the trustee. In another model, such as where the trustee is a vendor providing the key-recovery service, it may be preferred that the user can only extract the escrowed ciphertext with the help of a utility provided by the vendor (at an applicant's request). This utility might be provided to the applicant only after confirming the applicant's identity (even before it is matched with the escrowed identification). In the extreme model, one might even require that the trustee be given physical access (or even possession) of the equipment before extracting the key. This latter requirement could facilitate the return by the trustee of the equipment to its rightful owner. Once the trustee acquires the escrow record, the trustee then decrypts the escrow information and compares the applicant's credentials with the identification stipulated by the true owner of the escrowed information. The trustee utilizes the documentary evidence presented by the alleged legitimate user and determines whether such evidence matches the previously encrypted escrow information stored in the escrow record created by the user. If they agree, then the trustee has confidence that the true owner is making the request, and that revealing the secret key will not betray the owner's interest and subject the trustee to possible legal action.

It may be that the applicant's credentials are ambiguous—in that they (seem to) confirm the applicant, but not to the level of certainty required—falling below the level of proof required by the trustee, or perhaps not meeting all demands initially set or demanded by the true owner at the time the secret and identification was escrowed.

If the two fail to match, then the trustee can take whatever action seems appropriate, including locating the true owner based on the identification embodied in the escrowed information and informing him of the attempted impersonation; attempting to obtain the apparently stolen computer with the intent of returning it to the true owner; informing the police or other authorities of the suspected crime; or determining that the applicant, while not the true owner, may actually have the right to valid access (perhaps by virtue of being the employer). In this case, the applicant would have so advised the trustee and presented sufficient additional credentials.

Different embodiments may determine which, if any, of the various identification facts may appear in the escrowed information outside of the encrypted portion, and how much with the encrypted portion. It may be desirable to encrypt all of the identifying information. This way, an attacker will have fewer clues with which to attempt impersonation. On the other hand, if some of the (more innocuous) information were stored in the escrow record in cleartext, then this could enable a good Samaritan to know the equipment's rightful owner in case of loss.

The above and other features and advantages of the invention and the manner of realizing them will become more apparent and the invention itself will be better understood from a study of the following detailed description and the appended claims with references to the attached drawings showing some exemplary embodiments of the invention.

DETAILED DESCRIPTION OF THE DRAWINGS

Figure 1:
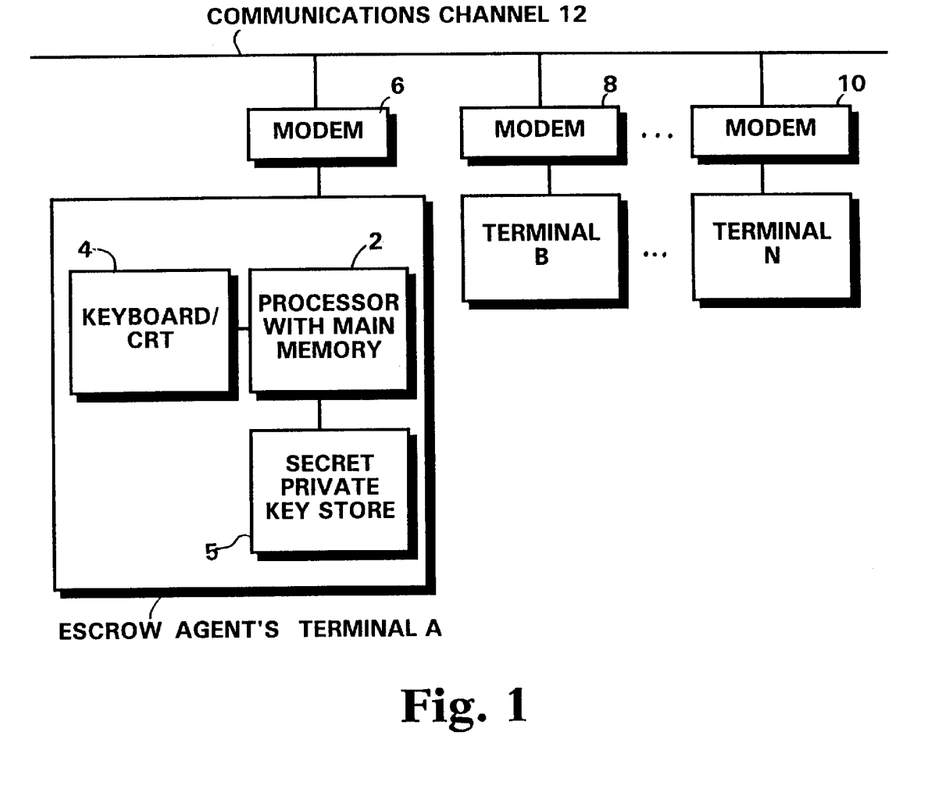
FIG. 1 shows in block diagram form an exemplary communications system with which the present invention may be employed.

FIG. 1 shows in block diagram form an exemplary communications system with which the present invention may be employed. The system may include a communications channel 12 which may, for example, be a telephone line or other unsecured channel over which communications between terminals A, B, . . . take place. In the illustrative system shown in FIG. 1, terminal A represents a data processing system used by the escrow agent/trustee/vendor. Terminals B through N illustrate user-based computer terminals, the legitimate owners of which utilize the vendor to escrow password/secret information in accordance with the methodology described below.

Terminals A, B . . . N may, by way of example only, each include an IBM PC compatible processor with main memory 2 which is coupled to a conventional keyboard/CRT display 4. The vendor's data processing system (Terminal A) additionally includes a secret private key storage device 5 for storing at least the private half of a public/private key pair. The contents of storage device 5 are only accessible to processor module 2. Processor 2 retrieves plain text escrow information by decrypting the escrow ciphertext with the private key stored in private key storage 5. Processor 2 may be a secure processor which is sensitive to physical tampering by an unauthorized employee or thief to reduce the possibility of contamination with a trojan horse or other virus. Storage device 5 is preferably a read-only memory (ROM) (which may be used as a program memory for processor module 2) which is sufficiently secure such that employees of the vendor are unable to determine the contents of the storage device, i.e., the private key. Storage device 5 may be embodied, if desired, in processor module 2.

An escrow record containing user passwords and/or other secret information is also stored in the escrow agent's terminal A (either soon after generation or during the password retrieval process) as will be explained below. Any desired method for securely storing the password may be utilized.

Terminals A, B . . . N also include a conventional IBM communications board (not shown) which when coupled to a conventional modem 6, 8, 10, respectively, permits message transmission and reception. Each terminal is capable of generating a message, performing whatever cryptographic and data processing operations may be required. Vendor terminal A is shown being coupled to a communications channel 12 for receipt of escrow information from users. However, it is not necessary that communications between the user and the vendor be through a telephone link. The escrow information could be transmitted to the vendor terminal via a floppy disk inserted into a floppy disk reader associated with processor 2 of the vendor terminal, or it may be that the entire terminals themselves may be brought to the trustee.

The terminals A, B, . . . N are also capable of performing cryptographic operations on messages as required. Digital signature operations may be performed using well-known public key cryptography methodology such as is described in the inventor's U.S. Pat. Nos. 4,868,877 and 5,214,702, which patents are hereby incorporated herein by reference.

Although FIG. 1 shows only one vendor terminal A, the present invention also contemplates split-key secret sharing, whereby one or more trustees receive "split-key" components of the user's secret to escrow. In this case, each trustee also receives appropriate user identification (possibly the same or possibly different). Distributing different aspects of the personal identifying information to each trustee reduces the ability of one corrupted trustee to know all the information necessary to trick other trustees into betraying their respective secrets.

The escrowed information may be maintained and/or extracted independently of other information. For example, in the case where the secret information is a password used to encrypt data on the user's hard disk, the user may retain possession of the hard disk, only delivering the isolated escrowed information to the trustee via communications channel 12. In this case, care must be taken that the escrowed information should not be also encrypted under control of the same password information which it is designed to recover. If an escrow record is written to the same encrypted hard disk as the escrowed cipher key, then it must be written to an area which is not protected with this encryption. This is acceptable since the escrowed information is encrypted under the trustee's public key. In this case, a special program to extract the escrow record from the hard disk could be used. This isolated information is then communicated to the trustee.

As a convenience during time of crisis, the trustee's name, address, telephone number, etc., may be kept in plaintext with the escrow information so the user need not be required to search through old files for this information. In some cases, it may be desirable if a binary representation of the escrowed information is printed on paper and held for access by a trustee in case of emergency. Such printed data would need to be reentered into a computer before the trustee could process it. In each of these embodiments, the trustee need never have access to the actual data which is encrypted under the escrowed key.

In operation in accordance with an exemplary implementation of the present invention, a user soon after purchasing, for example, a computer system such as terminal B shown in FIG. 1, is prompted during system setup operation to generate an escrow record including self-identification data to establish his or her identification. Such identification information may include the identification indicia described below in conjunction with FIG. 2 and, for example, the questions framed and answered in FIG. 3. The questions may establish the line of inquiry a vendor is authorized to pursue of the party claiming to be the rightful owner of a password which was lost or forgotten. The rightful owner or possessor (e.g., an authorized corporate employee) provides a "secret message" requesting the preferred protocol the trustee should use if the secret information is lost and what should be done in the face of suspected wrongdoing. This information is then written into an escrow information record which is encrypted with the vendor's public key.

If the password/secret information is ever lost and needs to be retrieved from the vendor, the user at terminal B electronically sends an escrow record to the vendor/escrow agent via modems 6 and 8. The vendor then decrypts the escrow information with the private key stored in secret storage 5 and proceeds to check the escrow information (as will be described below) and verify the user's identity by, for example, asking the questions specified by the original terminal B owner. If the identity is verified, the password is communicated to the requestor (who has been appropriately identified) via communication channel 12 in a secure fashion. Alternative implementations for storing and securing the secret private key and for processing the escrow information are also contemplated. For example, the secret key/password information could be stored on smart cards, which require the input of a PIN in order to trigger operation to retrieve the requested secret information.

Figure 2:
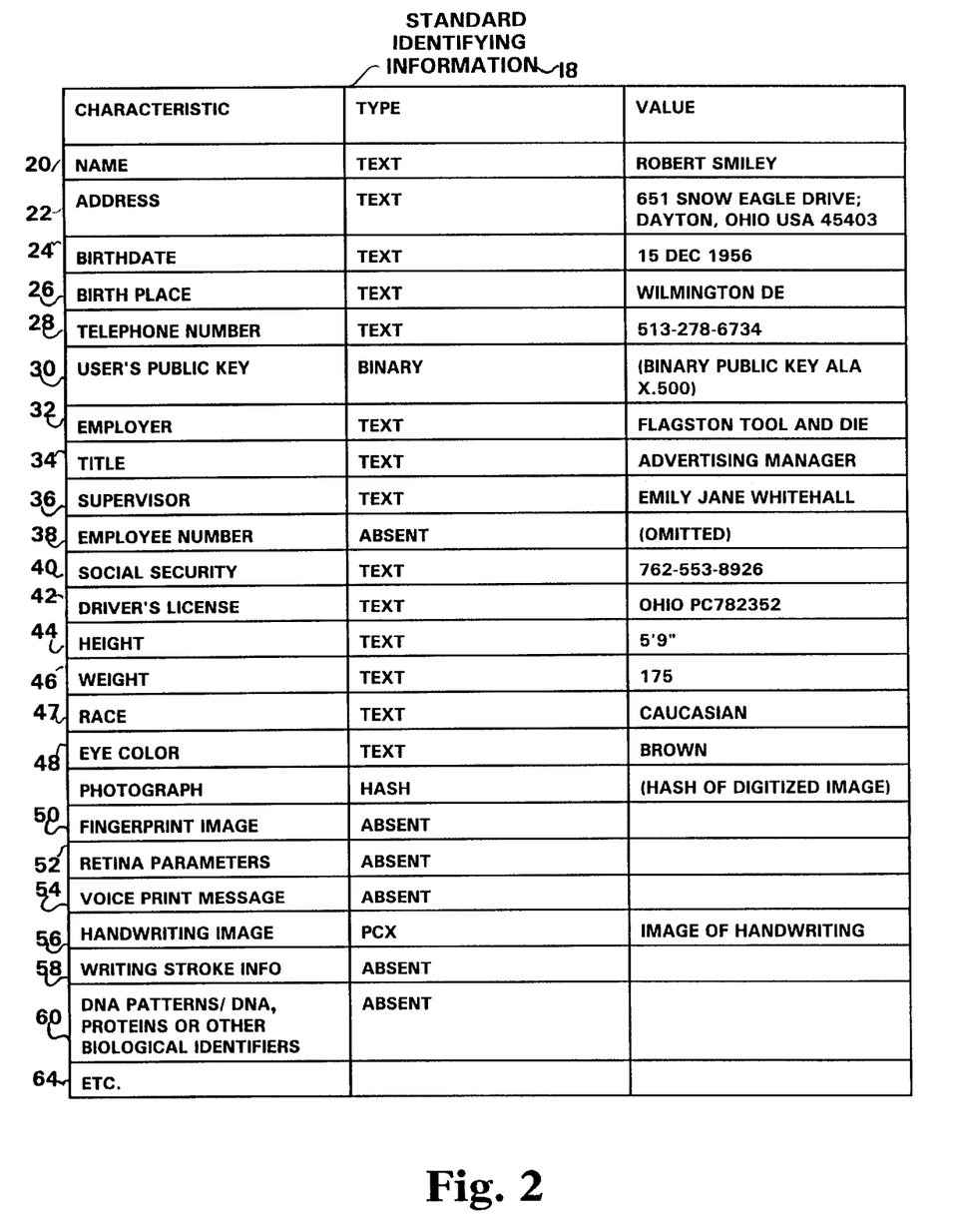
FIG. 2 illustrates exemplary "standard" identifying escrow information collected from a user.

FIG. 2 illustrates exemplary "standard" escrow information (18) that might be collected for identifying a rightful computer owner or possessor and includes data fields specifying data characteristics, (e.g., name, address, etc.). The standard escrow information digital tabulation additionally includes indicia identifying the type of data stored (e.g., text, binary, hash, etc.), and a value field identifying the specific information falling within the identified characteristic (e.g., specific name, address, etc.).

The exemplary "standard" escrow information shown in FIG. 2 is incorporated as part of the escrow record described below in conjunction with FIG. 4 (84). The identifying information is preferably provided by the user when the escrow agent is selected and defined and includes information, such as, the user's name 20, address 22, birth date 24, birth place 26, telephone number 28, user's public key 30, employer 32, job title 34, supervisor's name 36, employee number 38, social security number 40, and driver's license number 42. As indicated in FIG. 2, the identification data may be augmented to include physical information such as the user's height 44, weight 46, race 47, and eye color 48. The physical information may include such complex digitized information as digitized photographs 50, fingerprints 52, retina parameters 54, voice print message 56, handwriting image 58, writing stroke information 60, or even a digitized DNA pattern. Numerous alternative or additional identifying characteristics (64) may also be specified if desired. Some of such physical characteristic information may be documented, if desired, by an impartial judge, such as a notary public, and provided to the trustee as part of the applicant's request. The standard identification information may be augmented to include personal facts known only to the user, such as favorite foods, names of friends from the distant past, etc. This information may be used by a trustee to elicit more convincing evidence of identity.

Since some of this identification information is likely to be voluminous and is capable of being maintained off-line in other data bases, only the hash (using, e.g., MD5 or SHA) of the digitized data needs to be included in an escrow record. For example, if a user has a standard or official digitized photograph stored in an identification token or an organization's X.500 directory, then the user only needs to include the hash of this image in the escrow record. The user will then need to insure the trustee has a copy of the official digital photo when making a retrieval request to the trustee (s). The hash of this auxiliary information must agree with that specified in the escrow record. Any such defining information associated with the escrow record is then compared with the actual user (voice, height, complexion, age, etc.) or a user's authenticating document (driver's license, employee ID card, notary public statement, etc.).

In accordance with the presently preferred embodiment, the identification data together with the secret information to be escrowed (and this aggregation together with its hash) is encrypted under a random DES key which, in turn, is encrypted under the trustee's public key and then recorded. As part of any eventual retrieval request, the trustee must be presented with the source of any information referenced only by its hash in the escrow record. It is also contemplated in some implementations to only encrypt some of the identifying data (e.g., all data except the name). Keeping some or all of the defining identification hidden (except from the trustee) reduces the opportunity for a determined attacker to know what must be mimicked/forged.

The defining information need not be explicitly provided by the user but might be automatically determined by other information available at the time the secret is escrowed or might be provided by an agent of the user, such as the supervisor or enterprise security official, who installs the underlying security system on behalf of the actual user.

Figure 3:
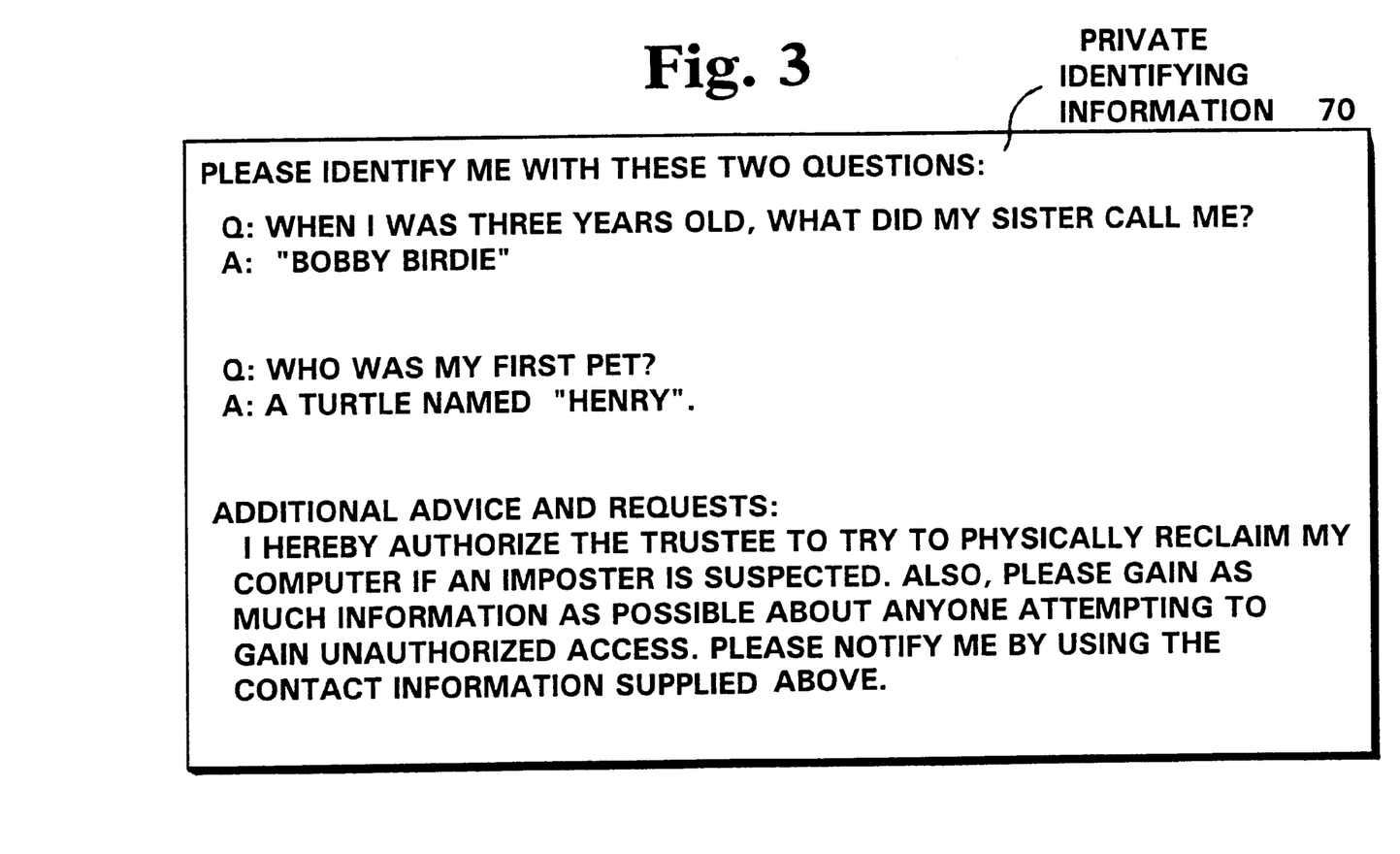
FIG. 3 shows exemplary "private" identifying information data reflecting private knowledge about which the user may be later queried together with other instructions or information or advice to the trustee.

FIG. 3 shows exemplary "private" identifying information data (reflecting private knowledge about which the user may be later queried) together with other instructions or information or advice for the trustee. For example, as shown in FIG. 3, the user identifies a question and an appropriate response which the trustee has been authorized to ask an alleged true owner seeking password information. Private information (70) include past personal events generally unknown to anyone except the owner, the names of obscure relatives, or any other unusual information that an attempted impersonator is not likely to know.

The information specified in the private information field may also include instructions as to how to handle a suspected impersonator including whether the trustee should attempt to recover the computer from a suspected impersonator and the nature and/or degree of proof the owner wishes the trustee to require, such as, a telephone voice request, digital signature, handwritten signature, delivery of a notarized request, personal interview, etc. In this fashion, the preferred protocol to be used by a trustee before divulging the secret information is specified by the user together with what should be done by the trustee in the face of suspected wrongdoing. If the personal private information is ever actually used for secret information retrieval, the data should be replaced with new information.

Figure 4:
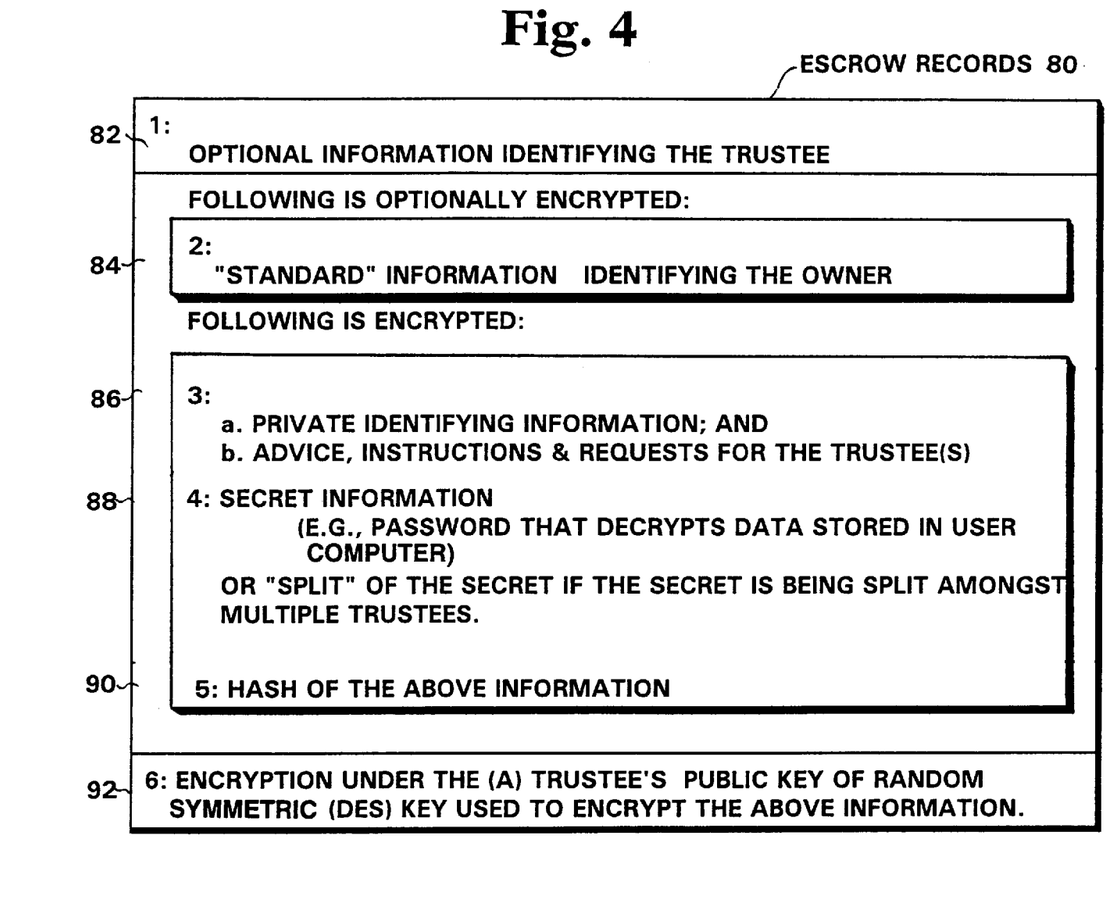
FIG. 4 is a data structure showing an exemplary escrow record

FIG. 4 is a data structure showing an exemplary escrow record (80). The escrow record 80 includes optional trustee identification field 82 identifying the trustee preferably in plain text. The escrow record also includes an optional "standard" information field 84 identifying the owner, using, for example, the information described in conjunction with FIG. 2. This standard information may, if desired, be encrypted as it is in the preferred embodiment. Escrow record 80 also has a field 86 including the private identifying information together with advice, instructions and requests for the trustees such as shown and described above in conjunction with FIG. 3. Additionally, the escrow record 80 includes a secret information field 88 containing, for example, the entire password that decrypts the data stored in the user's computer. Alternatively, the secret information may be "split" if the secret is being split among multiple trustees. In the case of "split" information, there will be multiple escrow components created—encrypted under respective public keys of each different trustee. Split escrowing can require that information must be retrieved from several trustees, and then combined in order to be able to reconstruct the user's secret. There are a number of known ways of doing this, including techniques described by Shamir's (one of the originator's of RSA public key cryptography) techniques. In this case, a user must convince some necessary subset of trustees (the various allowed subsets are defined when the secret is escrowed, and might be, for example, 2 out of 3, etc.) of his/her identity. The advantage of the split key approach is that no single trustee can, either deliberately or through error, compromise the system.

The escrow record 80 also contains in field 90 a hash of fields 82, 84, 86, and 88. Additionally, the record 80 includes a field 92 for storing the encryption under the trustee's public key of the random symmetric (e.g., DES) key used to encrypt the above information. In the case of multiple trustees and split key escrowing, the information to each trustee should be encrypted under a separate random symmetric (DES) key—otherwise any trustee would have the ability to decrypt the records belonging to other trustees (defeating the safeguards of key splitting).

Figure 5:
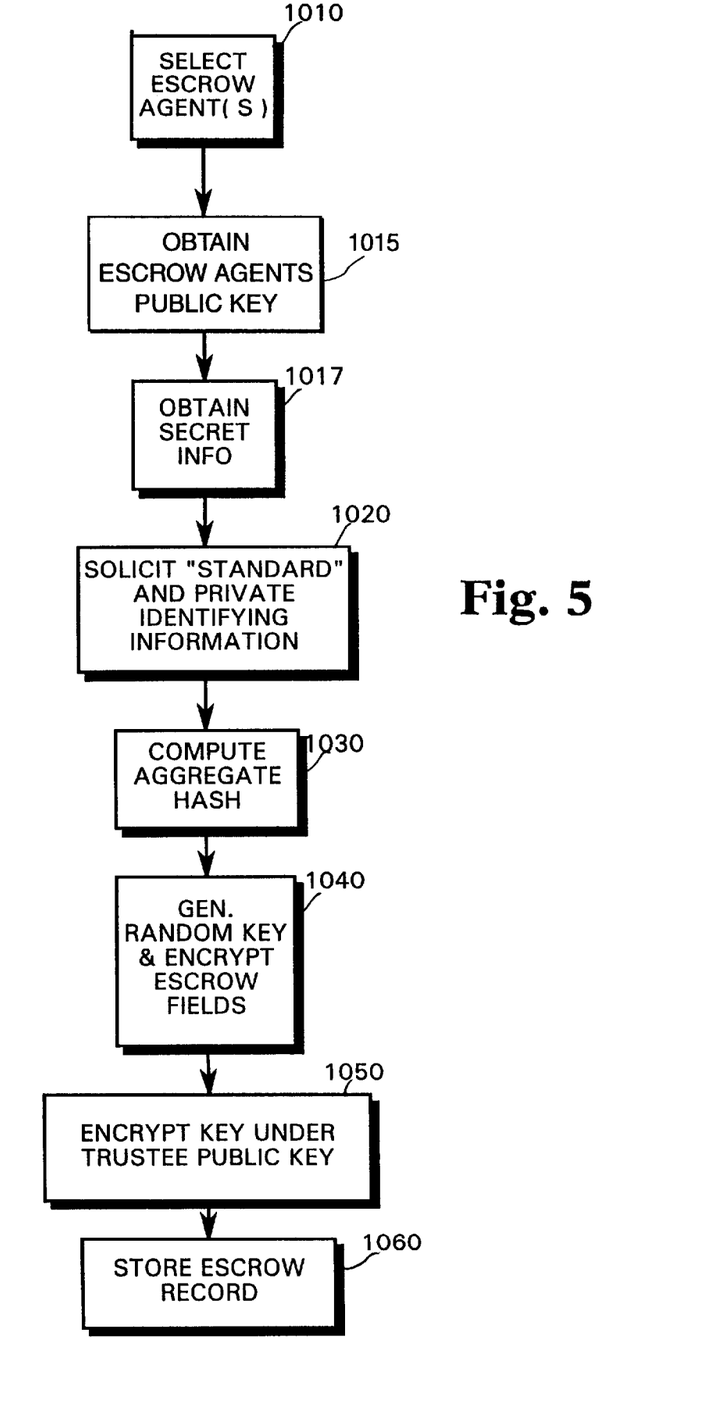
FIG. 5 is a flowchart which delineates the sequence of operations involved in the user identification or definition phase in accordance with an exemplary embodiment of the present invention.

FIG. 5 is a flowchart which delineates the sequence of operations involved in the user identification or definition phase of an exemplary embodiment of the present invention. The processing steps set forth in FIG. 5 solicit the user's selection and responses via a menu driven operator prompting routine. The routine shown in FIG. 5 preferably is executed when the user, who has just purchased a computer, initializes the computer or any time the user escrows a new secret. After the routine is initially executed, it does not necessarily need to reacquire information that is not subject to change (e.g., birth date, birth place, etc.) if it is available in some other way. As the operations shown in FIG. 5 are performed, the information including the secret information is placed in the escrow record format shown in FIG. 4.

When a user wishes to escrow a secret, such as a password or encryption key (or a vault combination, or a Swiss bank account number, or the formula for Coca Cola® or the like), the user first selects a trustee/escrow agent or set of escrow agents (1010). In some organizations, this might be stipulated by the organization. In split secret escrowing, there is more than one trustee, and there must be some way to determine how the escrow information is to be partitioned among the trustees. A separate escrow record and random symmetric key is generated for each trustee. After the user selects the trustee/escrow agent, the trustee's public key is obtained (1015) and the trustee's identification, possibly including public key and key-splitting reassembly rules, are loaded in the escrow record field 82.

After the trustee's public key or keys are obtained, the secret information is obtained and loaded into field 88 shown in FIG. 4 (1017). In some cases, the secret might be supplied by the user and in other cases it might be internally generated by the computer (e.g., in the case of defining encryption keys). Beginning at block 1020, the routine begins accumulating, via a sequence of operator prompts, the standard identifying information shown, for example, in FIG. 2, and loads such information into escrow record field 84 (FIG. 4). An operator prompt then provides a user the opportunity to supply private identifying information, and/or advice and instructions to the trustee and such information is loaded into field 86 shown in FIG. 4. More voluminous digital information, such as, a digitized photograph, voice samples, etc., may be readily accessible from other sources, such as X. 500 directories or other repositories. Such information is preferably incorporated into the aggregate information by including their much more compact hashes. In applying for retrieving secret information, the applicant should supply any necessary additional digital information as referenced by his or her hash in order for the trustee to check it. In any case, each identifying characteristic is labelled with explicit information indicating which characteristic is defined as well as the form of the inclusion (full data, inclusion by hash reference, etc.) as shown in FIG. 2.

In accordance with block 1030, the routine then computes the hash of the aggregate data and stores the computed hash in field 90 of escrow record 80. The computed hash is based on the standard identifying information (field 84), the private identifying information, if any, (field 86), the advice/instructions to the trustee, if any (field 86), and the secret information (e.g., the user's cipher password) from field 88. The hash is computed using any of various possible preferred hashing algorithms, such as, MD5 or the secure hash algorithm (SHA).

Thereafter, a random symmetric (e.g., DES) key is generated (1040) which is used to encrypt at least the following information: the secret information stored at escrow record field 88, the hash of the aggregate information in field 90, and the private identifying information, if any, in field 86. In the preferred embodiment, the advice/instructions in field 86 for the trustee are included as part of the private information and are preferably encrypted. The standard identifying information in field 84 could be encrypted in whole, in part, or not at all, depending on whether it is considered more beneficial, in the event of loss, to allow a finder to determine the identity of an owner or to give an adversary minimal information about the characteristics necessary to forge in order to dupe the trustee.

In step 1050, the symmetric cipher key as generated in accordance with step 1040 and is encrypted using the public key of the trustee. This encrypted value is stored in field 92 of the escrow record 80 (1060). For multiple trustees, the information should be encrypted with a random symmetric key unique to each trustee.

The escrow record 80 in accordance with block 1060 may be stored in a variety of acceptable locations. For example, the escrow record may be communicated to the trustee immediately for safekeeping or it may be written to a floppy disk and saved by the user until and if required. Alternatively, the escrow record 80 may be recorded on hard disk. If the escrowed secret is the password to the hard disk, then it must be recorded on a portion of the disk which is not so encrypted. Alternatively, the escrow record 80 may be communicated to a third party other than the trustee for independent storage. A printed version of the escrow record may be generated. As a convenience, it may be desirable to attach plaintext information (82) describing the trustee and how to communicate with him. With multiple trustees, this also helps distinguish the particular trustee with whom a particular piece is associated and which subsets of the trustee's comprise sufficient subsets to recover the secret.

Figure 6:
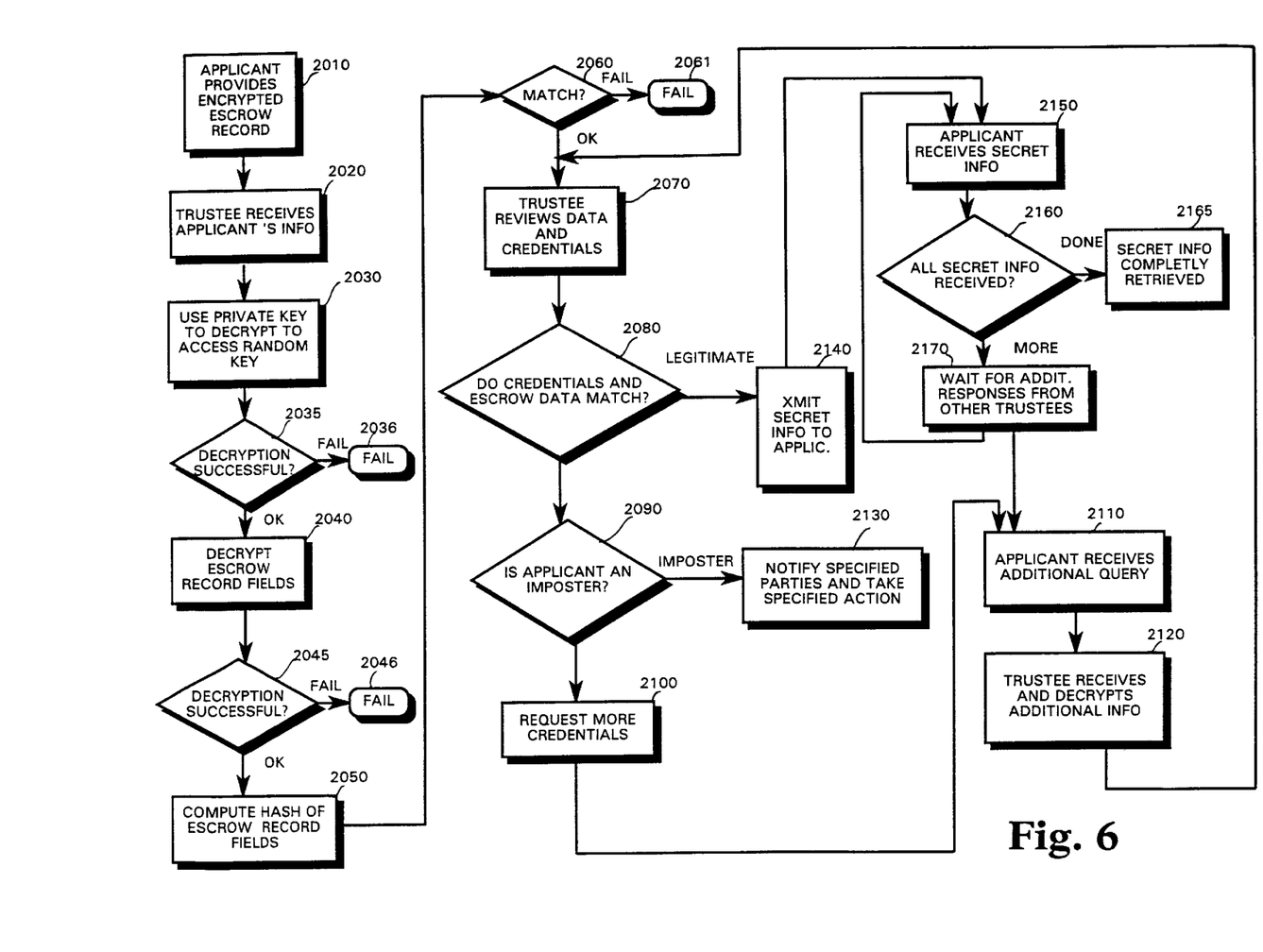
FIG. 6 is a flowchart delineating an exemplary sequence of operations performed when an applicant attempts to retrieve escrowed secret information.

FIG. 6 is a flowchart delineating the sequence of operations performed when an applicant attempts to retrieve escrowed secret information. The applicant may be the legitimate owner of the secret information or may be an imposter seeking to steal valuable information. As indicated at block 2010, the applicant provides the trustee with the escrow information record 80 which has been encrypted with the trustee's public key together with complete information for those items contained in the escrow record 80 which have been referenced only by a hash of the information, such as, for example, a digitized picture. The applicant also presents the trustee with documentation containing credentials that can be matched with the escrowed information. Such documentation may, for example, include a handwritten signed request for the secret information, an affidavit executed by a notary public attesting to the applicant's characteristics. The request for the secret information must be verifiable with the same public key stipulated in the escrow record. Additionally, the physical appearance of the applicant must match the described characteristics in the standard identifying information shown in FIG. 2 contained in the escrow record at field 84. In accordance with the preferred embodiment of block 2010, it is contemplated that a public key may be required from the applicant to define the public key under which the applicant wants the information returned. In this fashion, the trustee and the applicant may secretly communicate without any danger of the secret information being revealed to an opponent who intercepts the communication.

The trustee then receives the applicant's escrow record which has been extracted at block 2010 (2020) via the communication channel 12 shown in FIG. 1 or by any other mechanism, such as by mail or even physical delivery of the ent computer. The trustee then uses its secret private key to decrypt field 92 of the escrow record to thereby access the random symmetric key that encrypts the balance of the record (2030). If the trustee cannot decrypt field 92 using its private key, as determined by a check at block 2035, then the retrieval process fails and a appropriate failure message is returned to the applicant (2036).

If decryption check at block 2035 was successful, then the trustee decrypts fields 86, 88, 90, and, to the extent it is encrypted, field 84, such that all fields in the escrow record are processable in plain text (2040). A check is made at block 2045 to ensure that the decryption operations were successfully completed to confirm that reliable data is retrievable. If the decryption was not successful, then an appropriate failure message is communicated to the user (2046).

The trustee then recomputes the hash of escrow record fields 84, 86 and 88 (2050). A check is then made at block 2060 to determine if the recomputed hash matches the supplied hash value in field 90 of FIG. 4. If the hash values do not match, then retrieval is not permissible since the applicant's escrow data is not trustworthy and may reflect tampered ciphertext. Accordingly, the retrieval process cannot be reliably performed and an appropriate message is communicated to the applicant (2061).

If the hashes do match, then the trustee is assured that the escrow record has been delivered in correct form. The trustee then reviews the escrow record data (2070) to determine whether the escrowed identification is supported by the applicant's documented credentials provided to the trustee at block 2010. The trustee thereby determines whether the data which has been supplied via affidavit from a notary public, voice communication, etc., matches the escrow record data. Based on the received credentials, a determination is made at block 2080 whether the applicant appears to be the legitimate owner or has a genuine claim to the data (such as being the corporate owner of a secret managed by an employee).

If the check at block 2080 indicates that the applicant is entitled to the secret information, the trustee then encrypts the escrowed secret value contained in field 88 of FIG. 4 using the public key defined by the applicant's request (2010) or the public key defined in the escrowed information (30 of FIG. 2) and forwards the encrypted secret information to the applicant (2140).

If the check in block 2080 does not confirm that the applicant has a right to the secret information, then a check is made at block 2090 to determine if the applicant is an imposter. If the check at block 2090 indicates that there is enough information to determine that the applicant is an imposter then the routine branches to block 2130, where the trustee takes an appropriate action, including notifying the true owner, notifying the police, attempting to gain more information about the imposter, and/or attempting to gain physical possession of the stolen computer equipment. The action to be taken by the trustee is preferably specified in the escrow record in field 86 as part of the advice/instructions and requests to the trustee.

If the check at block 2090 indicates that there is not enough information to confirm whether the applicant is or is not an imposter, then the routine branches to block 2100 to request additional credentials as needed from the applicant in order to resolve the identification ambiguity. Such additional information may include a request for a source of digital biometrics (e.g., a digitized photograph) that may have been referenced by hash in the escrow record and not included in the initial application, questions suggested by the private identification information supplied in the escrow information, a personal interview, a telephone conversation, a signature witnessed by a notary public, a challenge/response based on the public key stipulated in the escrowed information, and documents verified by an independent third party, such as a driver's license. Production of the actual computer in question may be required, particularly if that was specified by the advice in the private identification information field 86. More reliable or more authenticated credential documentation may be required together with any other information necessary to confirm the identity of the applicant. If the credentials are requested electronically, then the request itself may be encrypted with either the public key supplied with the applicant's credentials or the public key contained in the escrow information.

If the applicant receives the additional query in block (2110) and it is encrypted, the applicant decrypts it with the appropriate private key. The applicant complies with the request by supplying additional credentials, or taking whatever steps are necessary to convince the trustee of his true identity. This may include a personal appearance, a telephone call or answering questions set forth in the escrowed private identification information. If the answers are returned electronically, then they can be encrypted under the trustee's public key.

As indicated at block 2120, the trustee receives the additional information and decrypts it as necessary. The additional credentials are combined with those already in hand and the routine branches back to block 2070 to resume the evaluation process. The evaluation process is repeated as often as necessary to confirm that the applicant is either legitimate at block 2080 or an imposter at block 2090.

If the applicant is legitimate, then as indicated above at block 2140, the secret information is transmitted to the applicant encrypted under the private key with the escrow information (30) or as supplied by the (now confirmed) application in 2010. The applicant receives the supplied escrowed secret information and decrypts the supplied secret information using the appropriate private key (2150).

If split key secret sharing is utilized, whereby each split key trustee receives a component of the user's secret, processing continues until the entirety of the secret information is accumulated. A check is made at block 2160 to determine whether the received escrow information is the last (or only) piece of the escrowed secret. For example, two or three trustees may be used to each escrow in part one-half or one-third of the secret information. The loop illustrated at block at blocks 2150–2170 reflect the processing to accumulate from each trustee all of the secret information. Once all the secret information is received is determined at 2160, then the applicant has regained sufficient information to restore the secret information, e.g., his or her password.

If the check at block 2160 indicates that more pieces of secret information need to be received from one or more escrow agents, then the routine branches to 2170, where processing steps are performed to ensure the acquisition of the additional escrowed pieces of the split secret until sufficient pieces are retrieved such that the original secret information can be assembled. If the processing at block 2170 indicates that one of the escrow agents requires additional information, then processing branches to block 2110 to thereby process the additional identification query to the applicant. If the processing at block 2170 results in a trustee supplying a missing piece of secret information then that information is forwarded to the applicant at block 2150. Ultimately, if the applicant is entitled to receive the secret information, all the secret information is assembled.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a computer system having a processor and a memory device coupled to said processor associated with a legitimate user of the computer system, a method for permitting secret digital information of the legitimate computer user to be subsequently recovered by a trustee, the method comprising the steps of:

storing identifying information in encrypted form, the identifying information identifying the legitimate computer user in an original digital data structure corresponding to the legitimate computer user;

storing secret encrypted digital information other than said encrypted identifying information in said digital data structure; and the trustee using said digital data structure to confirm the identify of the legitimate computer user, and after positive confirmation of identity, the trustee recovering the secret digital information.

* * * * *